US006542885B1

United States Patent
Nally et al.

(10) Patent No.: US 6,542,885 B1
(45) Date of Patent: Apr. 1, 2003

(54) METHODS, SYSTEMS AND COMPUTER PROGRAM PRODUCTS FOR CONTROLLING VARIABLES ASSOCIATES WITH TRANSACTIONS IN A MULTIPLE TRANSACTION ENVIRONMENT

(75) Inventors: Martin P. Nally, Raleigh, NC (US); Scott Rich, Apex, NC (US); Joseph P. Winchester, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/223,254

(22) Filed: Dec. 30, 1998

(51) Int. Cl.[7] .......................... G06F 17/30; G06F 15/00; G06F 9/445
(52) U.S. Cl. ...................... 707/2; 707/103 R; 709/101; 717/170
(58) Field of Search ................................ 709/101–108, 709/246, 311, 316, 326, 226, 203, 219, 223, 329; 717/1–3, 11, 170, 6; 714/19, 35, 50; 707/10, 1–3, 103 R, 104.1, 200; 710/48, 266; 345/734, 969, 970

(56) References Cited

U.S. PATENT DOCUMENTS 5,768,587 A * 6/1998 Frenund et al. ............. 709/101
6,167,564 A * 12/2000 Fontana et al. ................ 717/1
6,256,676 B1 * 7/2001 Taylor et al. ............... 709/246

OTHER PUBLICATIONS

Sun Microsystems—Enterprise JavaBeans TM, Matena et al., Mar. 21, 1998.*

* cited by examiner

Primary Examiner—Safet Metjahic
Assistant Examiner—Te Susan Chen
(74) Attorney, Agent, or Firm—Myers Bigel Sibley & Sajovec, P.A.; Gregory M. Doudnikoff

(57) ABSTRACT

Methods systems and computer program products are provided which provide a transacted variable. The transacted variable is associated with a specific transaction such that actions on the underlying object of the transacted variable do not affect the contents of the transacted variable unless the actions are carried out in the context of the specific transaction associated with the transacted variable. Furthermore, the transacted variable allows for actions to be taken in the context of its specific associated transaction irrespective of an active transaction.

18 Claims, 7 Drawing Sheets

METHODS, SYSTEMS AND COMPUTER PROGRAM PRODUCTS FOR CONTROLLING VARIABLES ASSOCIATES WITH TRANSACTIONS IN A MULTIPLE TRANSACTION ENVIRONMENT

FIELD OF THE INVENTION

The present invention relates to data processing systems and more particularly to data processing systems capable of carrying out multiple concurrent transactions.

BACKGROUND OF THE INVENTION

Increases in the use of computers throughout many differing environments has led to a wide range of computer users with differing levels of computer knowledge operating computers. Users ranging from, for example, the occasional home user to the dedicated software developer, may each have differing expectations for system performance as well as differing levels of complexity in an application program which may cause intimidation and, thus, a reluctance to use a product.

In an effort to reduce the complexity of applications and present a more "user friendly" computing environment, graphic user interfaces (GUIs) have been developed. GUIs are believed to present an easier to understand interface to an application's users and, thus, reduce the intimidation of an application. GUIs typically include multiple windows in which information is presented and user input obtained. Each of these windows may interact with one or more applications and may share data with one or more applications or other windows. However, development of these multiple window interfaces may be complex as interactions between the windows may be limited by the underlying application or by particular sequences of events which may be dictated by the windows.

A further complication in modern computing environments may be added in a network environment where multiple users share data across a computer network. Such an environment may provide convenience in that it allows a central repository of data but may add further complications in managing this data as multiple users may desire to access such data simultaneously or concurrently. Thus, applications and, in particular, user interfaces for applications may have increased complexity associated with them to manage the interaction of users with a shared network resource, such as a database, to coordinate users' interactions with the shared resource.

Efforts to reduce the complexity of developing applications in such complex environments have included International Business Machines, Inc.'s (IBM) VisualAge™ programming tools. This "visual" programming language takes advantage of object-oriented programming to provide programmers with program objects which may be visually manipulated to provide an application or portion of an application such as a user interface. Thus, a user may graphically represent an application or user interface as a collection of objects and then graphically define the interaction between the objects in the application or portion of the application.

While the visual programming languages may reduce the complexity of developing programs, further refinements in the management of objects may be needed to further simplify the complexities of multiple windows or multiple users. For example, to assure data integrity of shared data, conventionally systems have utilized a "transaction" paradigm which provides for isolation between transactions. A transaction represents a logical group of changes or operations associated with one or more objects that will be performed in an atomic manner (that is, either all operations within the transaction are performed, or none of them are performed). For example, the two-phase commit procedures associated with databases would be considered a transaction based paradigm. Imposition of a transaction based paradigm may allow for more orderly handling of multiple users with shared resources or multiple applications or portions of applications with shared resources (e.g. multiple windows in a user interface) by allowing isolation of transactions from each other such that the consequences of any single transaction on other transactions may be predicted and/or controlled via the commit procedure of the transaction. One method of isolation is provided by each transaction maintaining its own independent copy or version of all data or objects associated with the transaction until a commit is performed. At the commit time the versions are reconciled with the shared resource and the resource is either updated or the commit is rejected and the resource remains unchanged.

However, even in transaction based environments difficulties may arise where multiple transactions result in anomalous or undesirable results. For example, in the user interface example, if each window is treated as a transaction, then if a user is allowed to switch between different windows, multiple concurrent transactions may result. Similarly, if each user of multiple users of a shared resource is treated as a transaction, then multiple users concurrently accessing the resource may result in multiple concurrent transactions. However, if each of the multiple concurrent transactions utilize variables which are based on the same objects, then changes in one transaction to the variable may change the underlying object thereby effectively eliminating isolation between transactions. Several different approaches to provide solutions to such situations have been proposed, however, each of these solutions has its own limitations.

One proposed solution would be to provide only a single window such that only a single transaction is allowed. Thus, interactions difficulties between multiple transactions are avoided by not allowing multiple transactions. However, such a solution reduces the ability of graphic user interfaces to simplify the interface through the use of multiple windows. Furthermore, in the shared network resource environment such a solution would be impractical as it would mean that only a single user could utilize the shared resources at any given time.

One further approach is to make transactions "modal" in that each transaction must be completed before other transactions may be performed. However, such an approach may be restrictive in that the sequence of transactions may be artificially imposed on a user and, therefore, may not suit the users particular situation. For example, in a user interface if a dialog window is modal then its transaction must be completed before any other transaction (i.e. window) may be accessed. However, often users wish to switch between windows, for example when entering data, and do not wish to complete a transaction before switching to another window (i.e. another transaction). Such a modal system would require the user to enter the data and complete the data entry transaction before switching to another window which may result in prematurely committing data. It may then be difficult to "roll back" the committed data. Otherwise, the transaction associated with a window may cache the underlying data in its own variables, however, such a solution would not utilize the underlying domain objects and, therefore, would be less object oriented.

Another approach which may solve the above problem with modal transactions is to switch between transactions as dialog windows gain or lose focus. Thus, when a user selects another window the new window would have focus and the active transaction would switch to the transaction associated with the new window. However, such a system may result in errors resulting from the lack of control over the order in which transactions go in and out of focus or subtle differences in the way operating systems treat dialogs going in and out of focus. Furthermore, activity that is transaction sensitive may occur in a background dialog (such as a window without focus). For example, a domain model could be calling back to a user interface via a dependency mechanism in an attempt to have the user interface refresh the displayed values. If the dialog does not have focus and the transaction switching has not occurred, then the incorrect values may be retrieved.

In light of the above discussion, a need exists for improvement in the handling the interaction of transactions.

SUMMARY OF THE INVENTION

Accordingly, it is an object of the present invention to provide methods, systems and computer program products for managing variables in a multiple transaction environment.

A further object of the present invention is to provide a management system for the variables which is flexible while maintaining isolation between transactions.

These and other objects are provided, according to the present invention, by methods systems and computer program products which provide a transacted variable. The transacted variable is associated with a specific transaction such that actions on the underlying object of the transacted variable do not affect the contents of the transacted variable unless the actions are carried out in the context of the specific transaction associated with the transacted variable. Furthermore, the transacted variable allows for actions to be taken in the context of its specific associated transaction irrespective of an active transaction. Accordingly, the transacted variable provides isolation from other transactions but also does not constrain a system with regard to transaction switching or control over the active transaction.

In a particular embodiment, methods, systems and computer program products are provided for controlling variables in a multiple transaction data processing environment having an active transaction and inactive transactions by receiving at a variable an action request to perform an action associated with the variable. A transaction associated with the variable is determined and the determined transaction associated with the variable is established as the active transaction irrespective of a current active transaction. The action corresponding to the action request is performed and the determined transaction is removed as the active transaction so as to the previous current active transaction as the active transaction.

By associating a transaction with a variable, the transaction associated with the variable may be switched to become the active transaction irrespective of the current active transaction. Thus, the actions performed on the variable may be taken in the context of the associated transaction which is made the active transaction. Accordingly, the variable may be isolated from other transactions as actions on the variable are only taken in the context of the associated transaction. Furthermore, by making the associated transaction the active transaction irrespective of the active transaction, the limitation that actions are only taken on a variable when the transaction associated with the variable is active may be maintained which provides further isolation and control over the variable. However, replacing and then restoring the currently active transaction, the variable action may be taken in an unobtrusive manner and without requiring arbitrary switching constraints on an application such as a user interface. Thus, the isolation and control of the variable may be maintained without eliminating the constraints placed on variables by the transaction paradigm.

In a specific embodiment of the present invention, the transaction associated with the variable may be determined based on a transaction attribute associated with the variable. Furthermore, the variable may be an object and a variable wrapper associated with the object. In such a case, the wrapper may include as an attribute a transaction attribute having an attribute to attribute connection to the transaction associated with the variable. Furthermore, the receiving of action requests may comprise receiving a message at the wrapper and the action may be performed by forwarding the received message to the object wrapped by the wrapper.

In still another embodiment of the present invention, variables in a multiple transaction environment are controlled by determining if a variable has been requested to perform an operation and determining if a transaction is associated with the variable. The transaction associated with the variable is then as set as an active transaction, irrespective of the current active transaction, so as to replace the current transaction as the active transaction, if it is determined that the variable requested to perform an operation has an associated transaction. The requested operation is performed.

In a further embodiment, the current transaction is returned as the active transaction so as to replace the transaction associated with the variable as the active transaction.

In still another embodiment of the present invention, it may be determined if the variable has associated with it a transaction attribute which indicates a transaction other than the current active transaction. In such a case, the transaction specified by the transaction attribute is set as an active transaction, irrespective of the current active transaction, so as to replace the current transaction as the active transaction.

While the invention has been described above primarily with respect to the method aspects of the invention, both systems and computer program products are also provided.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As will be appreciated by one of skill in the art, the present invention may be embodied as methods, systems or computer program products. Accordingly, the present invention may take the form of a hardware embodiment, a software embodiment or an embodiment combining software and hardware aspects.

Figure 1:
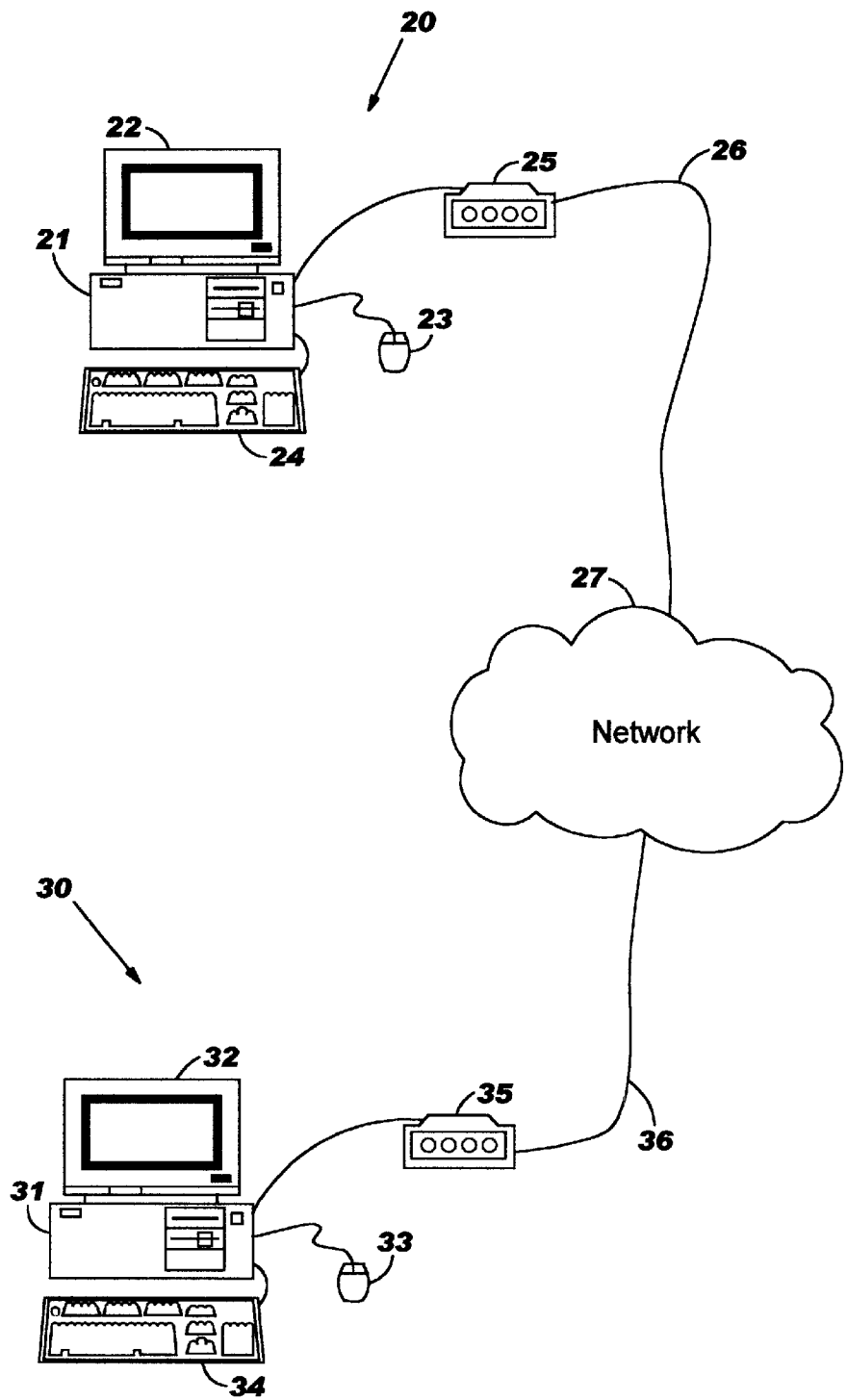
FIG. 1 is a block diagram of a data processing system suitable for use with the present invention.

The present invention provides for managed control of variables in a computing environment which allows for multiple concurrent transactions. Such control is provided by a "transacted variable." Transacted variables according to the present invention may be developed in a visual programming environment and may be part of an object oriented environment during both development and execution. Furthermore, transacted variables according to the present invention may be utilized in standalone workstations or data processing systems or in networks of data processing systems. FIG. 1 illustrates one operating environment in which transacted variables according to the present invention may be utilized.

As is illustrated in FIG. 1, users may access a network having shared resources or may operate in a standalone mode. In either case a user may execute an operating environment suitable for utilizing transacted variables according to the present invention running on a computer 20. Computers 20 may include, but is not limited to, Apple®, IBM®, or IBM-compatible personal computers or other data processing systems known to those of skill in the art. Computer 20 preferably includes a central processing unit 21, a display 22, a pointing device 23, a keyboard 24, a communications device 25 (such as a modem or network interface), and a connection 26 for connecting to a network 27. The keyboard 24, having a plurality of keys thereon, is in communication with the central processing unit 21. A pointing device 23, such as a mouse, is also connected to the central processing unit 21. The network connection 26 may be made via traditional phone lines, an ISDN link, a T1 link, a T3 link, via cable television, via a network adapter card (NIC) such as an ethernet adapter or a Token Ring™ (IBM) adapter or the like.

The central processing unit 21 contains one or more microprocessors (not shown) or other computational devices and random access memory (not shown) or its functional equivalent, including but not limited to, RAM, FLASHRAM, and VRAM for storing programs therein for processing by the microprocessor(s) or other computational devices. A portion of the random access memory and/or persistent data storage, referred to as "cache," is often utilized during execution of processing environments such as object oriented environments on computer 20 to store various data and program instructions.

Preferably, computer 20 has an Intel® Pentium® processor (or equivalent) with at least thirty-two megabytes (32 MB) of RAM, and at least five megabytes (5 MB) of persistent computer storage for caching. Even more preferable is an Intel® Pentium II® processor (or equivalent). However, it is to be understood that various processors may be utilized to carry out the present invention without being limited to those enumerated herein. Computer 20, if an IBM®, or IBM-compatible personal computer, preferably utilizes either a Windows® 3.1, Windows 95®, Windows 98®, Windows NT®, Unix®, or OS/2® operating system.

Furthermore, it is to be understood that a device not having computational capability, or having limited computational capability, may be utilized in accordance with the present invention for retrieving content through a network where the execution of the program instructions of the operating environment are executed remote from the workstation of the user. Thus, the present invention may also be utilized in "mainframe" systems where a plurality of terminals share a processing system. Such system are well known to those of skill in the art and, therefore, will not be described in detail herein.

In a networking environment, the present invention may be utilized in client/server or other such network environments, including intranet, extranet, and Internet environments utilizing Transport Control Protocol/Internet Protocol (TCP/IP) communications, Asynchronous Transfer Mode (ATM) or other such interconnection and communication protocols which allow communication between computers such as between a computer 20 and computer 30.

Computer 30 may have a configuration similar to that of a computer 20 and may include a central processing unit 31, a display 32, a pointing device 33, a keyboard 34, a communications device 35, and a network connection 36 for connecting to the network 27. However, computer 30 may be configure in the same manner or in a different manner than computer 20. Accordingly, the present invention may be utilized in a homogeneous or a heterogenous network. For example, computer 30 may be implemented using other processors and via other computing devices, including, but not limited to, mainframe computing systems and minicomputers.

Transacted variables according to the present invention may be particularly useful in object oriented systems such as systems utilizing "JavaBeans" which is the name of a component architecture for use with the Java programming language. ("JavaBeans" and "Java" are trademarks of Sun Microsystems, Inc.) A JavaBean is the Java term for a "component," where a component is a reusable building block of application logic that a programmer can combine with other components to form an application program. "Enterprise JavaBeans" is a server component architecture which extends the JavaBeans architecture to the enterprise. "Enterprise" in this sense refers to an organization that uses computers in a networking environment, typically on a very large scale.

A Java programmer creates a Java application program by assembling components that provide the desired functionality for an application. A JavaBean may contain code for a relatively simple function such as displaying a button on a GUI, but it may also contain quite complex code. An Enterprise JavaBean, or "EJB," is similar to a JavaBean, with several exceptions. JavaBeans are intended to execute locally, within the Java Virtual Machine ("JVM") on which a Java application is running. EJBs, on the other hand, are intended to execute on a server machine in a network, where they are remotely invoked by messages sent from a client machine's JVM. JavaBeans may provide code for visual objects, such as the GUI button discussed above; EJBs are always non-visual. The logic for a JavaBean is stored within the bean's "wrapper," where a "wrapper" is the Java term for functionality required to adapt a JavaBean or EJB to its container. A "container" is the Java terminology for an application context in which a bean (including an EJB) is executed. Thus, a JavaBean's logic is executed by invoking a method on the bean's wrapper, enabling the wrapper to detect when the bean has been modified (and thus needs to be updated in persistent storage). For EJBs, on the other hand, the executable logic is stored within the entity bean itself. Methods invoked by sending a message to an EJB's wrapper are forwarded to the bean for execution. Thus, the wrapper is not able to detect when an EJB has been modified.

Both JavaBeans and EJBs differ from conventional objects in object-oriented programming in that they have a required external interface. This interface is called the "properties" interface. Using this external interface, a development tool can interrogate the JavaBean or EJB, to determine what its component does and how its function is to be invoked by other components. The properties interface also enables developers to customize the behavior of components without having access to the source code. As a simple example, when the component contains code for displaying a button on a GUI, the developer may use a component property to specify the text that should be displayed on the button face.

A Java development environment typically includes class libraries for use by developers when programming (i.e. developing applications) in the Java language. Class libraries are reusable sets of reusable classes which typically provide relatively high level functionality. A class is one of the basic building blocks of object-oriented languages such as Java, and comprises code which represents a combination of logic function and data. A developer creates an application by adding classes from a class library to the software application being created. A copy, or "instance," of a class is then included in the application. Using the Java terminology, one or more classes may be combined to form a JavaBean, and one or more JavaBeans may then be combined to form an application. For the enterprise environment, Enterprise JavaBeans may be used in order to provide access to remotely-stored objects during development and deployment, as discussed earlier. These concepts and techniques of Java programming are well known to those skilled in the art, and will not be discussed in depth herein.

The present invention may also be utilized in systems such as those described in commonly assigned U.S. patent application Ser. No. 09/001,980, entitled TECHNIQUE FOR MANAGING OBJECTS WHICH ARE THE TARGET OF MULTIPLE TRANSACTIONS IN A CLIENT/SERVER ENVIRONMENT filed Dec. 31, 1997, the disclosure of which is incorporated herein as if set forth fully. However, the present invention may be utilized in other systems and should not be construed as limited to any particular system.

While the present invention is described with reference to a "wrapper" and other Java terminology, as will be appreciated by those of skill in the art in light of the present disclosure, the present disclosure uses such terms generically to describe functionality corresponding to those terms. According, the present invention should not be construed as limited to Java of JavaBean implementations by may be provided in other systems which provide the same or equivalent functionality. Such references to Java terminology, therefore, are provided for clarity purposes and are not intended to limit the present invention to a specific implementation.

As described above, a variable may wrapper an object to provide a proxied public interface or bean information responsible for presenting an interface to its value. The present invention provides an improvement over conventional variables by providing a "transacted variable." In one embodiment of the present invention, a transacted variable may be provided by subclassing (i.e. utilizing the inherited properties characteristics of object-oriented programming) a variable and its object so as to add a transaction attribute to the variable. The transaction attribute may then be set to an explicit transaction through an attribute to attribute connection to the specified transaction.

For scenarios where subclassing may not be the optimal solution, the transacted variable may be provided as a design time artifact to assist the developer in programmatically defining which transaction are associated with an object. The implementation of the transacted variable may be achieved through the use of well known programming techniques such as inner classes or the code generation of methods to broker the transaction switching around the access to the object contained within the transacted variable. Thus, any of a number of implementation methods for associating a transaction attribute with a variable so that the transaction attribute identifies the transaction associated with the variable may be utilized while still benefitting from the teachings of the present invention.

Whatever the actual implementation, be it through subclassing, inner classes or methods to broker transaction switching, when the transacted variable is asked to perform an action, the explicit transaction associated with the transaction attribute is made the active transaction irrespective of the original active transaction. As the active transaction, the explicit transaction of the transaction attribute of the transacted variable then performs the requested action and then returns the original active transaction to be the current active transaction. Examples of actions or operations which transacted variables may be requested to perform include modifying or retrieving the values of properties as well as performing action or executing methods.

According to the present invention, transaction sensitivity of variables may be maintained because the variables are associated with specific transactions. However, the problems of active versus inactive transactions may be avoided as actions of the variable make the transaction associated with the variable active such that if a transaction needs to be active because a variable associated with the transaction has an action to perform, then the transaction is seamlessly activated, the action performed and the previous transaction restored. Thus, transaction isolation may be maintained as actions on a variable may be controlled at the transaction level, rather than the underlying variable level, and changes which are not transaction sensitive may be isolated from those which are transaction sensitive. Thus, the present invention may be particularly useful in the development and applications incorporating windowed interfaces or EJBs where isolation between transactions is particularly important.

Operations of the present invention will now be described with respect to the flowcharts of FIGS. 2 and 3. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 2:
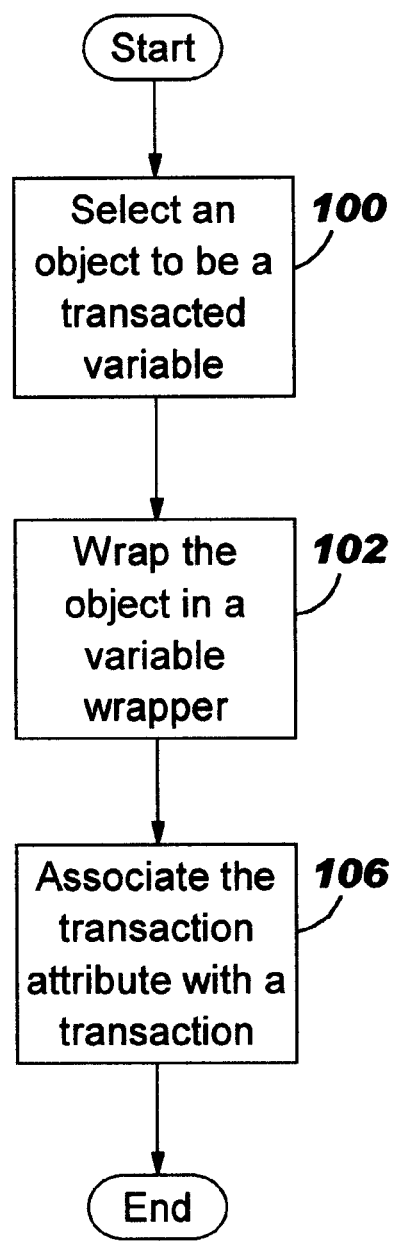
FIG. 2 is a flow chart illustrating operations for generating a transacted variable according to the present invention.
Figure 3:
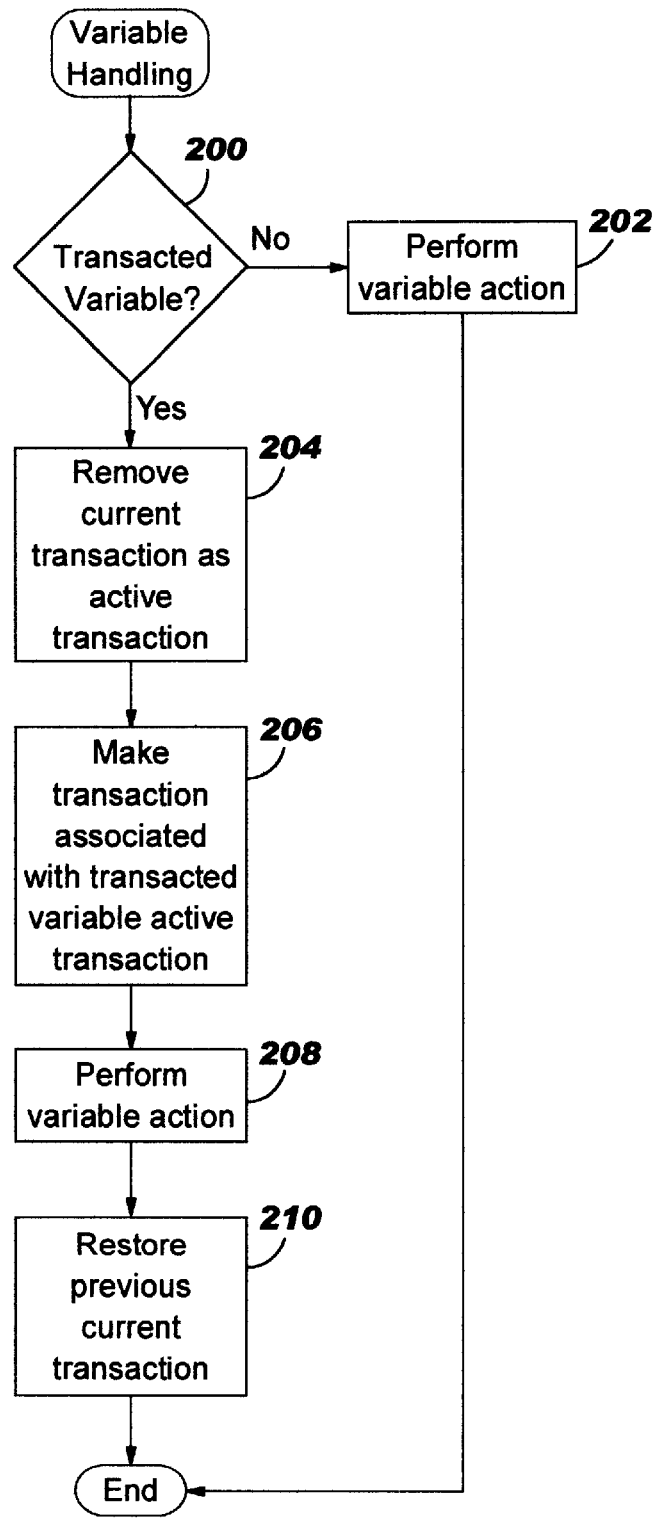
FIG. 3 is a flow chart illustrating run-time operations of a transacted variable according to the present invention.
Figure 4:
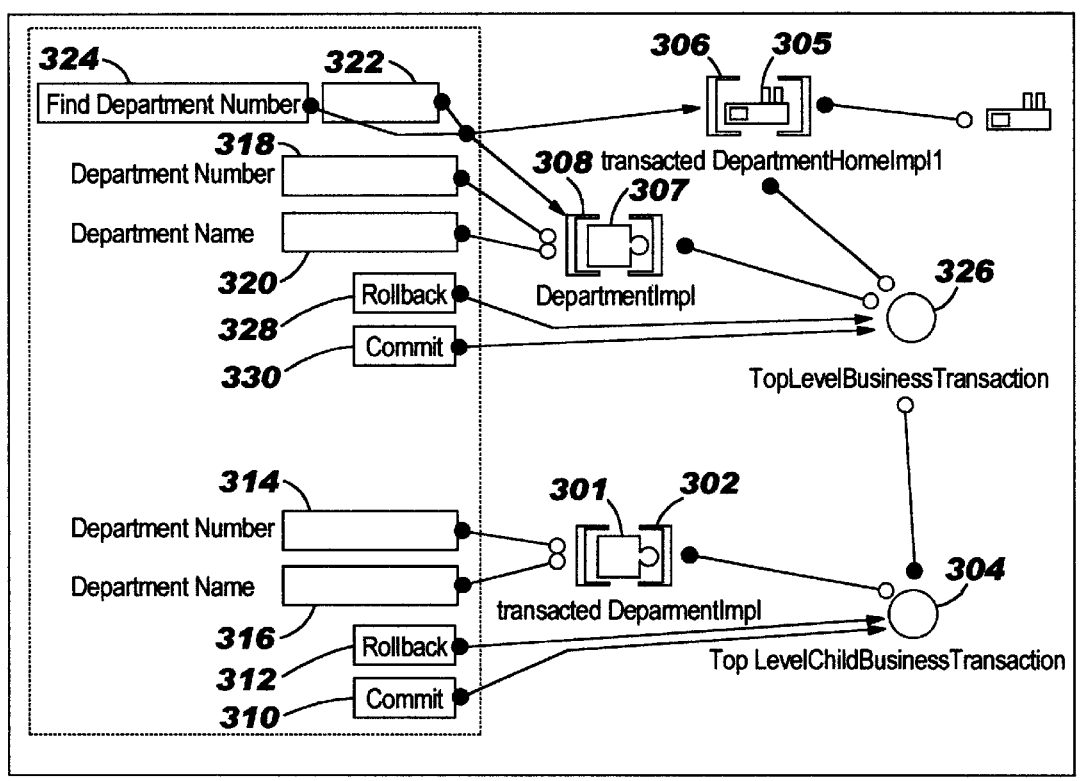
FIG. 4 is a diagram of an exemplary use of the present invention in a user interface developed using VisualAge.

FIG. 2 illustrates operations for establishing a transacted variable according to one embodiment of the present invention. As seen in FIG. 2, a user may select an object to be the subject of a transacted variable (block 100). For example, FIG. 4 schematically illustrates one example of a user interface definition utilizing a visual programming language, such as VisualAge, which may be executing on a computer system such as those described in FIG. 1. As seen in FIG. 4, visual composition window 300 illustrates an object such as the "transacted DepartmentHomeImpl1" 305, the DepartmentImpl1 307 and the "transacted DepartmentImpl" object 301 which have been selected as the subjects of transacted variables.

The selected objects are wrapped in a transacted variable wrapper (block 102) includes a transaction attribute as part of the variable wrapper. As discussed above, this transacted variable wrapper may be implemented in any number of manners including subclassing, inner classes or through method generation. Thus, objects 301, 305 and 307 are wrapped in a transacted variable wrapper to provide transacted variables 302, 306 and 308. As illustrated in FIG. 4, the transacted variable wrapper is illustrated as having closed braces surrounding the object to represent the transacted variable wrapper.

Returning to FIG. 2, the transaction attribute of the transacted variable wrapped object is associated with a transaction (block 106) such that when the variable receives a message or is otherwise requested to perform an action on its underlying object, the associated transaction becomes the active transaction irrespective of any current active transaction. Such an association is illustrated in FIG. 4 by, for example, the connection from the transacted variable 306 to the "TopLevelBusinessTransaction" 326. Further "attribute-to-attribute" connections of transacted variables are illustrated by the connection of transacted variable 302 to "TopLevelChildBusinessTransaction" 304 and transacted variables 306 and 308 to "TopLevelBusinessTransaction" 326.

FIG. 4 further illustrates definitions for data entry and display windows 314 and 316 which are associated with transacted variable 302, data entry and display windows 318 and 320 which are associated with transacted variable 308 and data entry and display window 322 which is associated with transacted variable 306. Also illustrated are action buttons 310, 312, 324, 328 and 330 which control the operations of the various transactions which make up the defined user interface. For example, selection by a user of action button 310 in the user interface would result in a commit operation of the "TopLevelChildBusinessTransaction" 304.

Figure 5:
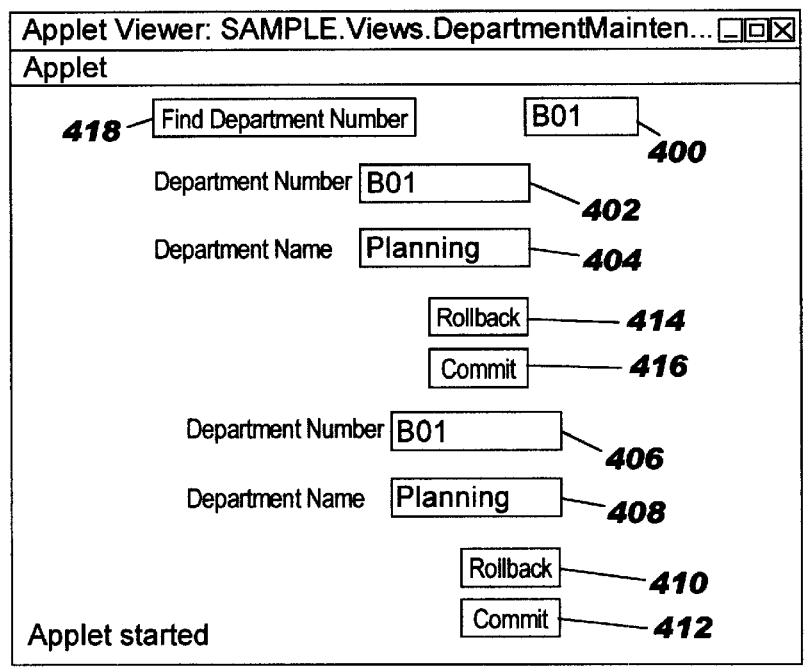
FIG. 5 and FIG. 6 are diagrams of the user interface defined by FIG. 4 and which illustrate the interaction of transacted variables according to the present invention.
Figure 6:
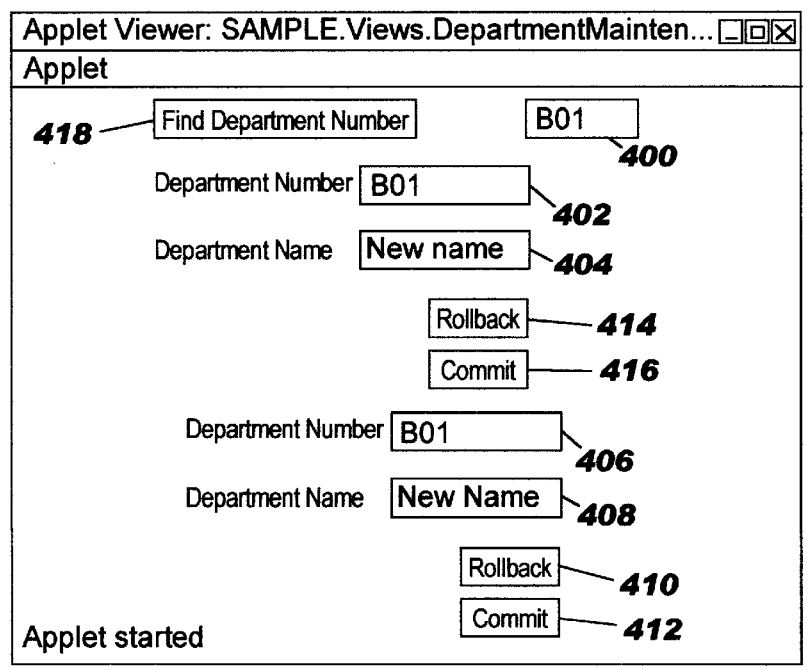

When executing, the definition of FIG. 4 provides a user interface as seen in FIG. 5 and FIG. 6. As seen in FIG. 5, a user interface is provided which includes a data entry and display field 400 corresponding to the field definition 322 which is associated with transacted variable 306 and "TopLevelBusinessTransaction" 326, data entry and display fields 402 and 404 corresponding to the field definitions 318 and 320 which are associated with transacted variable 308 and "TopLevelBusinessTransaction" 326, data entry and display fields 406 and 408 corresponding to the field definitions 314 and 316 which are associated with transacted variable 302 and "TopLevelChildBusinessTransaction" 304. Similarly, buttons 418, 414 and 416 are associated with "TopLevelBusinessTransaction" 326 and buttons 410 and 412 are associated with "TopLevelChildBusinessTransaction" 304. Thus, multiple transactions are represented in the user interface of FIGS. 5 and 6. FIG. 5 further illustrates the user interface after data has been retrieved, for example, for "department B01" and is displayed in the various fields of the user interface.

Logical operations of a transacted variable according to the present invention during execution of a multiple transaction environment, for example, in a user interface such as the user interface defined in FIG. 4, will now be described with respect to FIG. 3. As seen in FIG. 3, when a variable is accessed, by for example, a user entering data such as the "New Name" data in a field such as field 404 as illustrated in FIG. 6, it is determined if the associated variable is a transacted variable (block 200). Because data is entered in field 404 then an action is to be performed on the transacted variable 302. In such a case, the action would involve a transacted variable (block 200), and the current active transaction would be removed as the active transaction (block 204). The transaction defined by the transaction attribute of the transacted variable is then made the active transaction (block 206) and the action is performed (block 208) on the transacted variable. The previous active transaction is then restored as the active transaction (block 210) by removing the transaction associated with the transacted variable as the active transaction and replacing it with the previous current transaction.

Thus, in the present example, the underlying object associated with the transacted variable of field 404 would have its data changed from "Planning" to "New Name" as is seen in FIG. 6. However, as is further seen in FIG. 6, the change to the object associated with field 404 does not result in a change in the object associated with field 408 because the variables associated with fields 404 and 408 are transacted variables associated with different transactions which isolates the underlying object within a different transaction.

Thus, in the present example, if TopLevelChildBusinessTransaction 304 was the active transaction and a change was made to field 404, TopLevelChildBusinessTransaction 304 would be removed as the active transaction. TopLevelBusinessTransaction 326 would be made the active transaction and the requested action performed on the object 307 of transacted variable 308. TopLevelBusinessTransaction 326 would then be removed as the active transaction and the active transaction restored to TopLevelChildBusinessTransaction 304. Such operations allow for the isolation of transacted variable 308 from other transactions but also allow for actions to be performed with respect to transacted variable 308 irrespective of the current active transaction. Thus, a user may move through the user interface without requiring premature commits or rollbacks of an active transaction so as to maintain transaction isolation.

Figure 7:
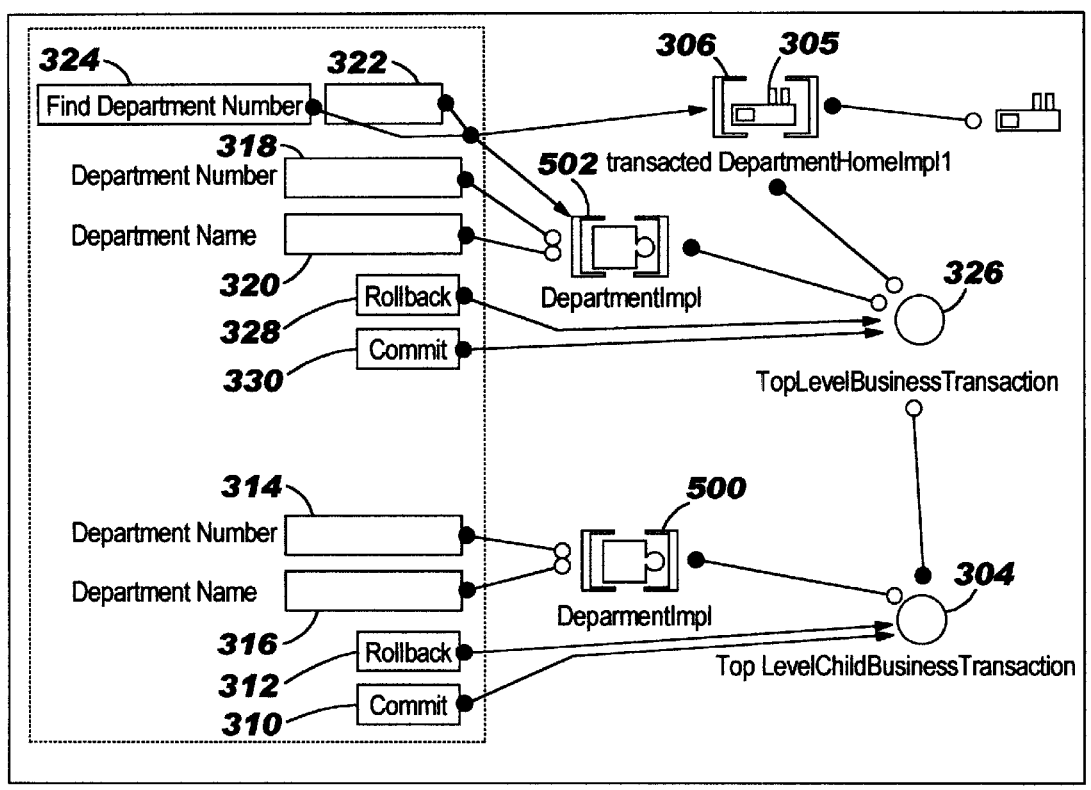
FIG. 7 is a diagram of an exemplary use of a conventional variable in a user interface developed using VisualAge.
Figure 8:
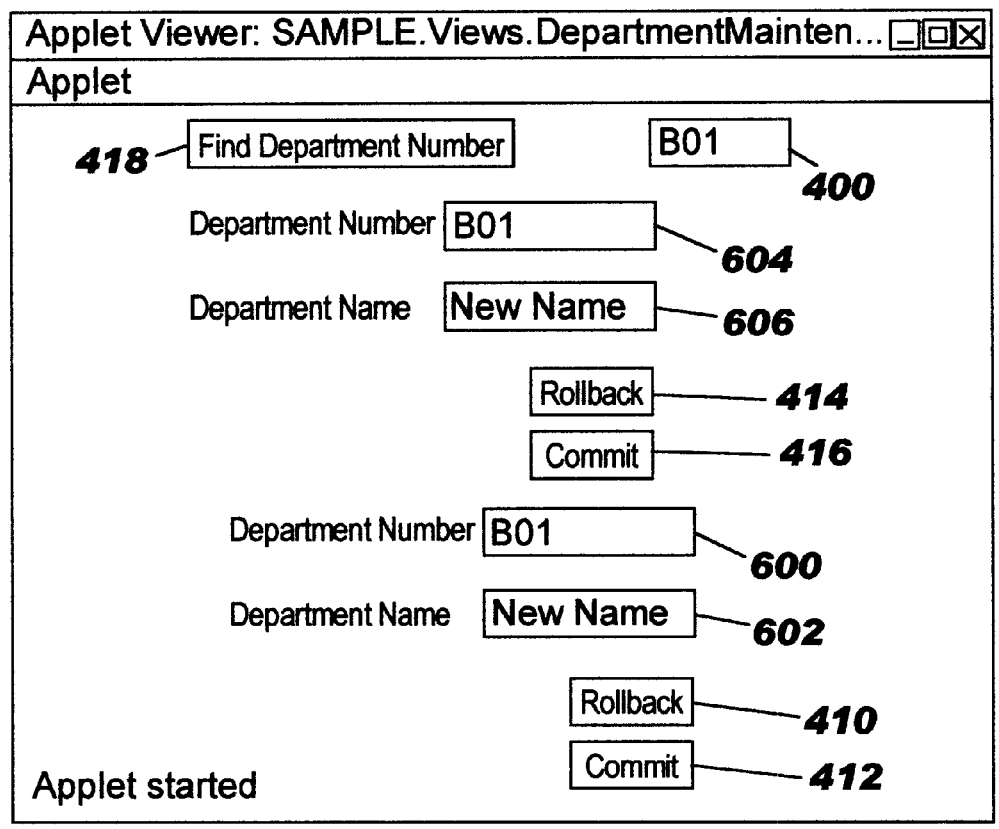
FIG. 8 is a diagrams of the user interface defined by FIG. 7 and which illustrate the interaction of conventional variables.

As an example in contrast to the transacted variable example described above, FIG. 7 illustrates a user interface definition such as that of FIG. 4, however, variables 500 and 502 are not transacted variables (as illustrated by the open braces representing the variable wrapper). As seen in FIG. 8, fields 600 and 602 are associated with variable 500 and fields 604 and 606 are associated with variable 502 which each have as an underlying object "DepartmentImpl." When a user changes either of the fields 606 or 602, then the determination of block 200 of FIG. 3 would determine that the variable accessed was not a transacted variable. The requested action (a change in the data) would then be performed (block 202) and the data in both fields changes because the underlying object of the variables 500 and 502 has been modified. Thus, there is no isolation between transactions as these fields may be modified in either transaction TopLevelBusinessTransaction or TopLevelChildTransaction.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of controlling variables in a multiple transaction data processing environment having an active transaction and inactive transactions, the method comprising the steps of:

receiving at a variable an action request to perform an action associated with the variable;

determining a transaction associated with the variable;

setting the active transaction to the determined transaction associated with the variable irrespective of a current active transaction if it is determined that the variable requested to perform an action has an associated transaction; then performing the action corresponding to the action request;

removing the determined transaction as the active transaction; and restoring the current active transaction as the active transaction.

2. A method of controlling variables in a multiple transaction data processing environment having an active transaction and inactive transactions, the method comprising the steps of:

receiving at a variable an action request to perform an action associated with the variable;

determining a transaction associated with the variable;

setting the active transaction to the determined transaction associated with the variable irrespective of a current active transaction if it is determined that the variable requested to perform an action has an associated transaction; then wherein the determining step comprises the step of determining the transaction associated with the variable based on a transaction attribute associated with the variable.

3. A method according to claim 2, wherein the variable comprises an object and a variable wrapper associated with the object and wherein the variable wrapper includes as an attribute a transaction attribute having an attribute to attribute connection to the transaction associated with the variable.

4. A method according to claim 3, wherein the receiving step comprises the step of receiving a message at the variable wrapper and wherein the performing step comprises the step of forwarding the received message to the object.

5. A method of controlling variables in a multiple transaction environment, the method comprising the steps of:

determining if a variable has been requested to perform an operation;

determining if a transaction is associated with the variable;

setting the transaction associated with the variable as an active transaction, irrespective of the current active transaction, so as to replace the current transaction as the active transaction, if it is determined that the variable requested to perform an operation has an associated transaction;

performing the requested operation; and returning the current transaction as the active transaction so as to replace the transaction associated with the variable as the active transaction.

6. A method according to claim 5, wherein the step of determining if a transaction is associated with the variable comprises the step of determining if the variable has associated with it a transaction attribute which indicates a transaction other than the current transaction; and wherein the setting step comprises the step of setting the transaction specified by the transaction attribute as an active transaction, irrespective of the current active transaction, so as to replace the current transaction as the active transaction.

7. A system for controlling variables in a multiple transaction data processing environment having an active transaction and inactive transactions, comprising:

means for receiving at a variable an action request to perform an action associated with the variable;

means for determining a transaction associated with the variable;

means for setting the active transaction to the determined transaction associated with the variable irrespective of a current active transaction if it is determined that the variable requested to perform an action has an associated transaction;

means for performing the action corresponding to the action request;

means for removing the determined transaction as the active transaction; and means for restoring the current active transaction as the active transaction.

8. A system for controlling variables in a multiple transaction data processing environment having an active transaction and inactive transactions, comprising:

means for receiving at a variable an action request to perform an action associated with the variable;

means for determining a transaction associated with the variable;

means for setting the active transaction to the determined transaction associated with the variable irrespective of a current active transaction if it is determined that the variable requested to perform an action has an associated transaction;

means for performing the action corresponding to the action request; and wherein the means for determining comprises means for determining the transaction associated with the variable based on a transaction attribute associated with the variable.

9. A system according to claim 8, wherein the variable comprises an object and a variable wrapper associated with the object and wherein the variable wrapper includes as an attribute a transaction attribute having an attribute to attribute connection to the transaction associated with the variable.

10. A system according to claim 9, wherein the means for receiving comprises means for receiving a message at the variable wrapper and wherein the means for performing comprises means for forwarding the received message to the object.

11. A system for controlling variables in a multiple transaction environment, comprising:

means for determining if a variable has been requested to perform an operation;

means for determining if a transaction is associated with the variable;

means for setting the transaction associated with the variable as an active transaction, irrespective of the current active transaction, so as to replace the current transaction as the active transaction, if it is determined that the variable requested to perform an operation has an associated transaction;

means for performing the requested operation; and means for returning the current transaction as the active transaction so as to replace the transaction associated with the variable as the active transaction.

12. A system according to claim 11, wherein the means for determining if a transaction is associated with the variable comprises means for determining if the variable has associated with it a transaction attribute which indicates a transaction other than the current transaction; and wherein the means for setting comprises means for setting the transaction specified by the transaction attribute as an active transaction, irrespective of the current active transaction, so as to replace the current transaction as the active transaction.

13. A computer program product for controlling variables in a multiple transaction data processing environment having an active transaction and inactive transactions, comprising:

a computer readable storage medium having computer readable program code means embodied in said medium, said computer-readable program code means comprising:

computer-readable program code means for receiving at a variable an action request to perform an action associated with the variable;

computer-readable program code means for determining a transaction associated with the variable;

computer readable program code means for setting the active transaction to the determined transaction associated with the variable irrespective of a current active transaction if it is determined that the variable requested to perform an action has an associated transaction;

computer-readable program code means for performing the action corresponding to the action request;

computer-readable program code means for removing the determined transaction as the active transaction; and computer-readable program code means for restoring the current active transaction as the active transaction.

14. A computer program product for controlling variables in a multiple transaction data processing environment having an active transaction and inactive transactions, comprising:

a computer readable storage medium having computer readable program code means embodied in said medium, said computer-readable program code means comprising:

computer-readable program code means for receiving at a variable an action request to perform an action associated with the variable;

computer-readable program code means for determining a transaction associated with the variable;

computer readable program code means for setting the active transaction to the determined transaction associated with the variable irrespective of a current active transaction if it is determined that the variable requested to perform an action has an associated transaction;

computer-readable program code means for performing the action corresponding to the action request; and wherein the computer-readable program code means for determining comprises computer-readable program code means for determining the transaction associated with the variable based on a transaction attribute associated with the variable.

15. A computer program product according to claim 14, wherein the variable comprises an object and a variable wrapper associated with the object and wherein the variable wrapper includes as an attribute a transaction attribute having an attribute to attribute connection to the transaction associated with the variable.

16. A computer program product according to claim 15, wherein the computer-readable program code means for receiving comprises computer-readable program code means for receiving a message at the variable wrapper and wherein the means for performing comprises means for forwarding the received message to the object.

17. A computer program product for controlling variables in a multiple transaction environment, comprising:

a computer readable storage medium having computer readable program code means embodied in said medium, said computer-readable program code means comprising:

computer-readable program code means for determining if a variable has been requested to perform an operation;

computer-readable program code means for determining if a transaction is associated with the variable;

computer-readable program code means for setting the transaction associated with the variable as an active transaction, irrespective of the current active transaction, so as to replace the current transaction as the active transaction, if it is determined that the variable requested to perform an operation has an associated transaction;

computer-readable program code means for performing the requested operation; and computer-readable program code means for returning the current transaction as the active transaction so as to replace the transaction associated with the variable as the active transaction.

18. A computer program product according to claim 17, wherein the computer-readable program code means for determining if a transaction is associated with the variable comprises means for determining if the variable has associated with it a transaction attribute which indicates a transaction other than the current transaction; and wherein the computer-readable program code means for setting comprises computer-readable program code means for setting the transaction specified by the transaction attribute as an active transaction, irrespective of the current active transaction, so as to replace the current transaction as the active transaction.

* * * * *